| (12) | United States Patent | (10) Patent No.: | US 12,282,714 B2 |
|---|---|---|---|
| | Cox et al. | (45) Date of Patent: | Apr. 22, 2025 |

(54) PHYSICAL SYSTEM SIMULATION

(71) Applicant: THE BOEING COMPANY, Chicago, IL (US)

(72) Inventors: Kelsea Cox, Daniel Island, SC (US); Lindsay L. Jones, Madison, AL (US); Caroline M. Kerfonta, Weddington, NC (US); Brittan A. Farmer, Madison, AL (US); Richard J. Thompson, Huntsville, AL (US); Marcus A. Bakke, Seattle, WA (US); E-June Chen, Bothell, WA (US); David L. Carlson, Maple Valley, WA (US)

(73) Assignee: THE BOEING COMPANY, Arlington, VA (US)

( * ) Notice: Subject to any disclaimer, the term of this patent is extended or adjusted under 35 U.S.C. 154(b) by 993 days.

(21) Appl. No.: 17/339,672

(22) Filed: Jun. 4, 2021

(65) Prior Publication Data

US 2022/0067236 A1 Mar. 3, 2022

Related U.S. Application Data

(60) Provisional application No. 63/073,186, filed on Sep. 1, 2020.

(51) Int. Cl.
*G06F 30/20* (2020.01)
*G06F 119/02* (2020.01)

(52) U.S. Cl.
CPC .......... *G06F 30/20* (2020.01); *G06F 2119/02* (2020.01)

(58) Field of Classification Search
CPC ............................ G06F 30/20; G06F 2119/02
See application file for complete search history.

(56) References Cited

U.S. PATENT DOCUMENTS

| 7,979,247 B2 | 7/2011 | Butterfield et al. |
| 8,056,046 B2 | 11/2011 | Denby et al. |
| 8,068,983 B2 | 11/2011 | Vian et al. |
| 8,589,125 B2 | 11/2013 | Mori et al. |
| 9,116,850 B2 | 8/2015 | Retnamma et al. |
| 10,474,764 B1 | 11/2019 | Bolton et al. |

(Continued)

OTHER PUBLICATIONS

Sun Hye Kim, "Machine learning-based surrogate modeling for data-driven optimization: a comparison of subset selection for regression techniques" (Year: 2019).*

(Continued)

*Primary Examiner* — Emerson C Puente
*Assistant Examiner* — Adam Carrero
(74) *Attorney, Agent, or Firm* — Moore IP Law

(57) ABSTRACT

A device includes one or more processors configured to generate simulation data by providing first sets of first values of first input parameters to a simulation of a physical system. The processors are configured to develop at least one surrogate model based on the simulation data, and to select second input parameters from the first input parameters based on the at least one surrogate model. A count of the second input parameters is less than a count of the first input parameters. The processors are configured to generate second simulation data by providing second sets of second values of the second input parameters to the simulation. The processors are configured to develop at least a second surrogate model based on the second simulation data.

21 Claims, 5 Drawing Sheets

(56) References Cited

U.S. PATENT DOCUMENTS

| | | | |
|---|---|---|---|
| 2002/0183986 A1 | 12/2002 | Stewart et al. | |
| 2005/0257178 A1 | 11/2005 | Daems et al. | |
| 2006/0048880 A1 | 3/2006 | Blessing et al. | |
| 2008/0228409 A1 | 9/2008 | Nelson et al. | |
| 2009/0228293 A1 | 9/2009 | Fowler | |
| 2011/0029672 A1 | 2/2011 | Agneeswaran | |
| 2014/0195210 A1 | 7/2014 | Calmels | |
| 2020/0218232 A1* | 7/2020 | Tallman | F03D 7/046 |

OTHER PUBLICATIONS

Hui Zou, "Regularization and variable selection via the elastic net" (Year: 2004).*

Jihad A. Badra, "Combustion System Optimization of a Light-Duty GCI Engine Using CFD and Machine Learning" (Year: 2020).*

Booker, Andrew J., et al., "A Rigorous Framework for Optimization of Expensive Functions by Surrogates," CRPC-TR98739-S, Feb. 1998, revised Apr. 1998; Center for Research on Parallel Computation, Rice University, pp. 1-25.

Booker, Andrew J., et al., "Optimization Using Surrogate Objectives on a Helicopter Test Example," CRPC-TR97734S, Dec. 1997; Center for Research on Parallel Computation, Rice University, pp. 1-8.

Bowcutt, Kevin G., et al., "Advancements in Multidisciplinary Design Optimization Applied to Hypersonic Vehicles to Achieve Closure," American Institute of Aeronautics and Astronautics, 15th AIAA International Space Planes and ☐ Hypersonic Systems and Technologies Commerce, Apr. 28-May 1, 2008, Dayton, OH, pp. 1-12.

Cramer et al. "Practical Experience with a Multi-Objective Model-Management Framework Optimization Method". 12th AIAA w Aviation Technology, Integration, and Operations (ATIO) Conference and 14th AIAA/ISSM. Sep. 17-19, 2012, Indianapolis, Indiana. pp. 1-11.

Cramer, Ervin J., et al., "Problem Formulation for Multidisciplinary Optimization," SIAM J. Optimization, vol. 4, No. 4, Nov. 1994, pp. 754-776.

Frank, P. D., et al., "Optimization and Search Methods for Multidisciplinary Design," Boeing Computer Services, Dec. 1, 1991, pp. 1-72.

Lehner, S. G., et al., "Advanced Multidisciplinary Optimization Techniques for Efficient Subsonic Aircraft Design," 48th AIAA Aerospace Sciences Meeting Including the New Horizons Forum and Aerospace Exposition, Jan. 4-7, 2019, Orland, FL, pp. 1-12.

Marin, Pablo, et al., "Fixed bed membrane reactors for WGSR-based hydrogen production: Optimisation of modelling approaches and reactor performance," International Journal of Hydrogen Energy, vol. 37, 2012, pp. 4997-5010.

Melin et al. "Modeling and Analysis of High Energy Laser Weapon System Performance in Varying Atmospheric Conditions.", Air Force Institute of Technology. Sep. 2011. pp. 1-98.

Sobester, Andras, et al., "On the Design of Optimization Strategies Based on Global Response Surface Approximation Models," Journal of Global Optimization, 2005, vol. 33, pp. 31-59.

Weaver. "A Methodology for Ballistic Missile Defense Systems Analysis Using Nested Neural Networks". Georgia Institute of Technology. Aug. 2008. pp. 1-107.

Wikipedia, "Elastic net regularization", https://en.wikipedia.org/wiki/Elastic_net_regularization, printed on Jun. 3, 2021, pp. 1-4.

Wikipedia, "Finite element method" https://en.wikipedia.org/wiki/Finite_element_method, printed on Jun. 3, 2021, pp. 1-18.

Wikipedia, "Kriging", https://en.wikipedia.org/wiki/Kriging, printed on Jun. 3, 2021, pp. 1-10.

Wikipedia, "Latin hypercube sampling", https://en.wikipedia.org/wiki/Latin_hypercube_sampling, printed on Jun. 3, 2021, pp. 1-2.

Wittwer, Jonathan, "Simulation-Based Design Under Uncertainty for Compliant Microelectomechanical Systems," Brigham Young University, BYU Scholars Archive, Apr. 2005, pp. 1-214.

Zou et al., "Regularization and Variable Selection via the Elastic Net", ElasticNet, Department of Statistics Stanford University, pp. 1-32.

* cited by examiner

PHYSICAL SYSTEM SIMULATION

CROSS-REFERENCE TO RELATED APPLICATIONS

The present application claims the benefit of U.S. Provisional Patent Application No. 63/073,186 entitled "PHYSICAL SYSTEM SIMULATION," filed Sep. 1, 2020, the contents of which are incorporated by reference in their entirety.

FIELD OF THE DISCLOSURE

The present disclosure is generally related to simulation of a physical system.

BACKGROUND

Testing for failure modes of physical systems can be destructive, expensive, or both. For example, the testing could include measuring the effect of destruction of an expensive component of a physical system on other components. Complex physical systems can include a large number of variables. Performing multiple tests to analyze the effect on the components of the physical system of changes in the many variables can be destructive, time-consuming, and expensive.

SUMMARY

In a particular implementation, a device for physical system simulation includes a memory and one or more processors. The memory is configured to store a simulation of a physical system. The one or more processors are configured to generate initial simulation data by providing first sets of first values of first input parameters to the simulation. Each set of the first sets indicates a first value of each of the first input parameters. The one or more processors are also configured to develop at least one surrogate model based on the initial simulation data. The one or more processors are further configured to select second input parameters from the first input parameters based on the at least one surrogate model. A count of the second input parameters is less than a count of the first input parameters. The one or more processors are also configured to generate second simulation data by providing second sets of second values of the second input parameters to the simulation. Each set of the second sets indicates a second value of each of the second input parameters. The one or more processors are further configured to develop at least a second surrogate model based on the second simulation data.

In another particular implementation, a method of physical system simulation includes generating initial simulation data by providing first sets of first values of first input parameters to a simulation of a physical system. Each set of the first sets indicates a first value of each of the first input parameters. The method also includes developing at least one surrogate model based on the initial simulation data. The method further includes selecting second input parameters from the first input parameters based on the at least one surrogate model. A count of the second input parameters is less than a count of the first input parameters. The method also includes generating second simulation data by providing second sets of second values of the second input parameters to the simulation. Each set of the second sets indicates a second value of each of the second input parameters. The method further includes developing at least a second surrogate model based on the second simulation data.

In another particular implementation, a non-transitory, computer readable medium storing instructions that, when executed by one or more processors, cause the one or more processors to generate initial simulation data by providing first sets of first values of first input parameters to a simulation of a physical system. Each set of the first sets indicates a first value of each of the first input parameters. The instructions, when executed by the one or more processors, also cause the one or more processors to develop at least one surrogate model based on the initial simulation data. The instructions, when executed by the one or more processors, further cause the one or more processors to select second input parameters from the first input parameters based on the at least one surrogate model. A count of the second input parameters is less than a count of the first input parameters. The instructions, when executed by the one or more processors, further cause the one or more processors to generate second simulation data by providing second sets of second values of the second input parameters to the simulation. Each set of the second sets indicates a second value of each of the second input parameters. The instructions, when executed by the one or more processors, also cause the one or more processors to develop at least a second surrogate model based on the second simulation data.

The features, functions, and advantages described herein can be achieved independently in various implementations or may be combined in yet other implementations, further details of which can be found with reference to the following description and drawings.

DETAILED DESCRIPTION

Figure 1:
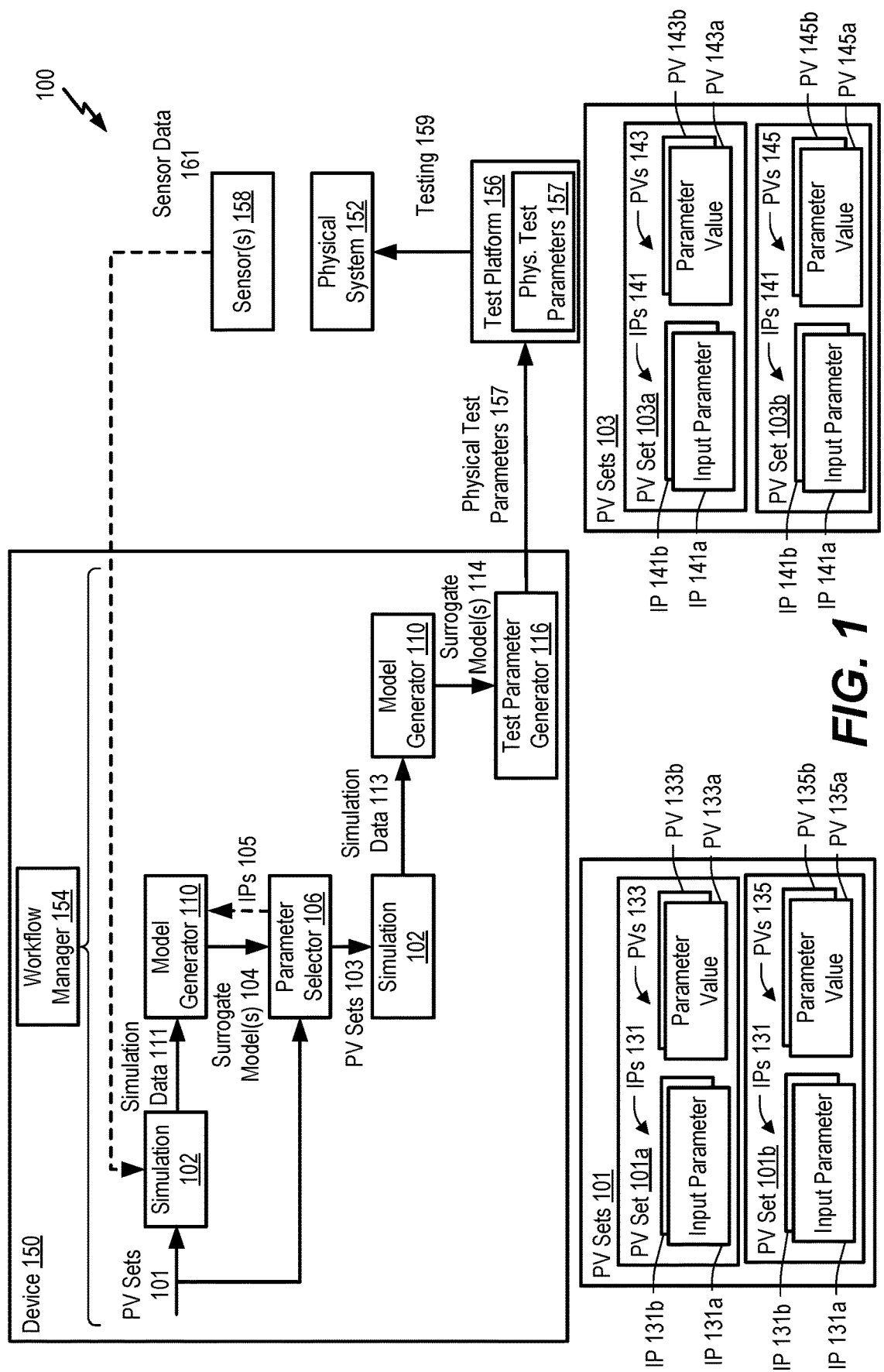
FIG. 1 is a diagram that illustrates a system configured to perform simulation of a physical system.

Aspects disclosed herein present systems and methods for physical system simulation. For example, a simulation of a physical system can be used to design experiments to test the physical system and update design parameters of the physical system. However, because a highly accurate physical system simulation can be computationally expensive and time-intensive to run, relatively few physical system simulations are run to gather data that is then used to generate lower-complexity, surrogate models.

To illustrate, the physical system simulation may use a relatively large number of input parameters (referred to as a "set" of input parameters), and the values of these input parameters can be adjusted for each run of the system simulator in order to test the response of the system to different initial conditions. For an example, one of the input parameters of a turbine simulation may be "impeller speed."

For different runs of the simulation, different values of the input parameter "impeller speed" can be used. A first set of values of the input parameters that includes "8,000 rotations per minute (RPM)" for the impeller speed can be used for a first run, a second set of values of the input parameters that includes "10,000 RPM" for the impeller speed can be used for a second run, and a third set values of the input parameters that includes "12,000 RPM" for the impeller speed can be used for a third run, to roughly determine how the overall system reacts to changes in impeller speed over the range of 8,000-12,000 RPM. However, when the system simulation uses a large set (e.g., hundreds) of input parameters, it becomes infeasible to exhaustively test the reaction of the system to different values for each of the input parameters.

To conserve time and resources, initial simulation data is generated using a relatively small number of sets of parameter values (e.g., performing a small number of simulation runs, with each run using a different set of values for the input parameters). Because processing each set of parameter values for a large number of input parameters can be time-intensive, a small number of sets (e.g., a small number of simulation runs) are processed to generate the initial simulation data relatively quickly.

One or more first surrogate models are developed to identify a subset of the input parameters that are significant. An input parameter is significant relative to measured responses from an engine test (e.g., a potentially destructive test). For example, in a destructive fan blade-out test, input parameters that most significantly affect the axial or rotational maximum loading that causes engine failure are to be identified as significant input parameters. In a particular example, the significant input parameters are identified using a multi-stage process. A first stage includes using an elastic net surrogate model developed based on the initial simulation data to identify a group of the input parameters that are significant. Additional stages include using one or more linear models, inferential statistics, engineering knowledge, or a combination thereof, to identify a subset of the group of input parameters that are significant. Having identified the most significant input parameters, additional runs (e.g., a large number of simulation runs) of the physical system simulation are performed that focus on these input parameters to generate second simulation data. Processing parameter values for selected input parameters reduces computation time, while processing a higher number of sets of parameter values increases coverage and reliability of the produced simulation data.

One or more second surrogate models are developed based on the second simulation data (e.g., the more reliable simulation data). For example, a Kriging model is developed based on the second simulation data. The one or more second surrogate models are used to determine test parameters, design parameters, or both, for the physical system. Using the second surrogate models (e.g., reliable surrogate models) to determine test parameters, design parameters, or both, can result in fewer expensive (and in some cases, destructive) tests to have to be performed on the physical system.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple parameter value sets are illustrated and associated with reference numbers 101a and 101b. When referring to a particular one of these designs, such as the parameter value set 101a, the distinguishing letter "a" is used. However, when referring to any arbitrary one of these parameter value sets or to these parameter value sets as a group, the reference number 101 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a model generator 110 that generates one or more surrogate models 104 ("surrogate model(s)" 104 in FIG. 1), which indicates that in some implementations the model generator 110 generates a single surrogate model 104 and in other implementations the model generator 110 generates multiple surrogate models 104. For ease of reference herein, such features are generally introduced as "one or more" features, and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to perform physical system simulation. The system 100 includes a device 150 coupled via a test platform 156 to a physical system 152. As an illustrative non-limiting example, the physical system 152 can include one or more components of a manufacturing system, an aircraft, a ground vehicle, an aquatic vehicle, an aerospace system, or a combination thereof. In a particular example, the physical system 152 includes a large-scale complex engineering system (LSCES).

In a particular aspect, the system 100 includes one or more sensors 158 configured to monitor the physical system 152. For example, the sensor 158 include a temperature sensor, a chemical sensor, a video camera, an image sensor, a humidity sensor, a flow sensor, an altitude sensor, a speed sensor, or a combination thereof. In a particular example, one or more of the sensor 158 are coupled to the physical system 152. In a particular example, one or more of the sensor 158 are proximate to the physical system 152. The device 150, the test platform 156, the physical system 152, the sensor 158, or a combination thereof, are interconnected via one or more networks to enable data communications.

The device 150 includes a workflow manager 154, a simulation 102 of the physical system 152, a model generator 110, a parameter selector 106, a test parameter generator 116, or a combination thereof. The workflow manager 154 is configured to manage the simulation 102, the model generator 110, the parameter selector 106, the test parameter generator 116, or a combination thereof, to generate one or more physical test parameters 157 and to provide the physical test parameters 157 to the test platform 156. The test platform 156 is configured to initiate testing 159 of the physical system 152 based on the physical test parameters 157. The sensor 158 is configured to provide the sensor data 161 to the device 150. In a particular aspect, the workflow manager 154 is configured to update the simulation 102 based on the sensor data 161. For example, the workflow manager 154 uses the sensor data 161 as feedback to update the simulation 102 to more closely represent the physical system 152, such as to account for any changes in the physical system 152 over time.

During operation, the workflow manager 154 provides a plurality of parameter value ("PV") sets 101 to the simulation 102. For example, the workflow manager 154 provides the parameter value sets 101 to the simulation 102 in response to receiving a request (e.g., a user input) to generate parameters for testing the physical system 152. The parameter value sets 101 indicate parameter values of a plurality of input parameters 131. In a particular aspect, the parameter value sets 101 indicate the changing parameter values of the input parameters 131 over simulation time. For example, the parameter value sets 101 include a parameter value set 101a that indicates parameter values 133 of the input parameters 131 to be simulated as detected at a first simulation time (or detected during a first simulation time range). To illustrate, the parameter value set 101a indicates that an input parameter 131a (e.g., a speed) and an input parameter 131b (e.g., fuel level) have an input parameter value 133a (e.g., a first speed) and an input parameter value 133b (e.g., a first fuel level), respectively, to be simulated as detected at the first simulation time (or detected during the first simulation time range). As another example, the parameter value sets 101 include a parameter value set 101b that indicates parameter values 135 of the input parameters 131 to be simulated as detected at a second simulation time (or detected during a second simulation time range). To illustrate, the parameter value set 101b indicates that the input parameter 131a (e.g., the speed) and the input parameter 131b (e.g., the fuel level) have an input parameter value 135a (e.g., a second speed) and an input parameter value 135b (e.g., a second fuel level), respectively, to be simulated as detected at the second simulation time (or detected during the second simulation time range). In a particular aspect, the parameter value sets 101 indicate parameter values of the input parameters 131 at various simulated time intervals (e.g., every 30 seconds of simulation time). For example, a difference between the second simulated time (or the second simulated time range) and the first simulated time (or the first simulated time range) corresponds to a particular time interval (e.g., 30 seconds).

In a particular aspect, the parameter value sets 101 indicate initial conditions for separate simulations (e.g., instead of changing parameter values of the input parameters 131 over simulation time). In an example, the parameter value sets 101 include a parameter value set 101a that indicates parameter values 133 of the input parameters 131 as initial conditions for a first simulation run. In addition, the parameter value sets 101 include a parameter value set 101b that indicates parameter values 135 of the input parameters 131 as initial conditions for a second simulation run. The second simulation run is independent of the first simulation run.

In a particular aspect, the parameter value sets 101 indicate possible parameter values of the input parameters ("IPs") 131. In a particular aspect, the workflow manager 154 generates the parameter value sets 101 using various experiment design techniques. For example, the workflow manager 154 generates the parameter value sets 101 using orthogonal array sampling, Latin hypercube sampling, or random sampling.

The workflow manager 154 generates simulation data 111 by providing the parameter value sets 101 to the simulation 102. In a particular aspect, the simulation 102 is based on finite element modeling, finite volume modeling, eigenmode decomposition analysis, eigenvalue analysis, eigenstate analysis, iterative first-principle modeling, or a combination thereof. For example, finite element modeling can be used to simulate physics of the physical system 152 with high fidelity. In a particular example, the simulation data 111 corresponds to sensor data predicted to be generated by the sensor 158 during testing of the physical system 152 based on test parameters corresponding to the parameter value sets 101.

In a particular aspect, the model generator 110 evaluates the simulation 102 using a sparse design of experiment (DoE) approach, such as an orthogonal array experimental design approach. For example, the model generator 110 generates one or more surrogate models 104 based on the simulation data 111, the parameter value sets 101, or a combination thereof, as further described with reference to FIG. 2. In a particular aspect, the surrogate model 104 includes an elastic net surrogate model. The parameter selector 106 selects a plurality of input parameters 141 to be included in parameter value sets 103 for additional processing at the simulation 102. For example, the input parameters 141 include an input parameter 141a, an input parameter 141b, one or more additional input parameters, or a combination thereof. The input parameters 141 are selected from the input parameters 131 based on the surrogate model 104, as further described with reference to FIG. 2. For example, the parameter selector 106 uses the elastic net surrogate model to select the input parameters 141 from the input parameters 131.

In a particular aspect, the input parameters 141 are selected in multiple stages. For example, during a first stage, the parameter selector 106 uses a first set of the surrogate models 104 to select a group (e.g., input parameters 105) of the input parameters 131. During a second stage, the model generator 110 uses the input parameters 105 to generate a second set of the surrogate models 104, and the parameter selector 106 selects the input parameters 141 from the input parameters 105 based on the second set of surrogate models 104, as further described with reference to FIG. 2.

For example, the parameter selector 106 uses the elastic net surrogate model to select input parameters 105 from the input parameters 131. To illustrate, the elastic net surrogate model identifies the input parameters 105 as significant input parameters. The model generator 110 generates a linear surrogate model based on the input parameters 105 (e.g., the significant input parameters). In this example, the parameter selector 106 selects the input parameters 141 from the input parameters 105 based on the linear surrogate model, as further described with reference to FIG. 2. Using the elastic net surrogate model enables identification of significant input parameters that can be modeled by the linear surrogate model. Evaluating the linear surrogate model can be more efficient (e.g., less time, fewer computation cycles, or both) than evaluating the simulation 102. In a particular aspect, the parameter selector 106, during additional stages of the input parameter selection, adds or removes input parameters from the input parameters 141 based on inferential statistics, engineering knowledge, experiment design techniques, or a combination thereof, as further described with reference to FIGS. 2-3. In a particular aspect, one or more of the input parameters 141 are predetermined. For example, one or more of the input parameters 141 are selected based on user input, a configuration setting, default data, or a combination thereof.

The input parameters 141 (e.g., including a significantly reduced count of significant input parameters) selected from the input parameters 131 are processed by the simulation 102. For example, the workflow manager 154 generates simulation data 113 by providing a plurality of parameter value sets 103 to the simulation 102. The parameter value sets 103 indicate parameter values corresponding to the input parameters 141. To illustrate, the parameter value sets 103 includes a parameter value set 103a, a parameter value set 103b, one or more additional parameter value sets, or a combination thereof. The parameter value set 103a and the parameter value set 103b include parameter values 143 and parameter values 145, respectively, of the input parameters 141.

In a particular aspect, the parameter value sets 103 indicate changing parameter values of the input parameters 141 over simulation time. For example, the parameter value set 103a includes the parameter values 143 of the input parameters 141 associated with a first simulation time (or a first simulation time range), and the parameter value set 103b includes the parameter values 145 of the input parameters 141 associated with a second simulation time (or a second simulation time range). To illustrate, the parameter value set 103a indicates that an input parameter 141a (e.g., a speed) and an input parameter 141b (e.g., fuel level) have an input parameter value 143a (e.g., a first speed) and an input parameter value 143b (e.g., a first fuel level), respectively, to be simulated as detected at the first simulation time (or detected during the first simulation time range). As another example, the parameter value set 103b indicates that the input parameter 141a (e.g., the speed) and the input parameter 141b (e.g., the fuel level) have an input parameter value 145a (e.g., a second speed) and an input parameter value 145b (e.g., a second fuel level), respectively, to be simulated as detected at the second simulation time (or detected during the second simulation time range).

In a particular aspect, the parameter value sets 103 indicate initial conditions for separate simulations (e.g., instead of changing parameter values of the input parameters 141 over simulation time). In an example, the parameter value sets 103 include a parameter value set 103a that indicates parameter values 143 of the input parameters 141 as initial conditions for a first simulation run. In addition, the parameter value sets 103 include a parameter value set 103b that indicates parameter values 145 of the input parameters 141 as initial conditions for a second simulation run. The second simulation run is independent of the first simulation run.

In a particular aspect, a count of the input parameters 141 is less than a count of the input parameters 131, and a count of the parameter value sets 103 is greater than a count of the parameter value sets 101. For example, selection of relevant input parameters by the parameter selector 106 enables more sets of parameter values corresponding to fewer input parameters to be processed by the simulation 102 to generate the simulation data 113. In a particular aspect, more sets of parameter values for fewer input parameters are processed by the simulation 102 to generate the simulation data 113 as compared to the simulation data 111. Processing more sets of parameter values of relevant input parameters increases coverage of the simulation data 113 with a low impact (e.g., no impact) on reliability of the simulation data 113.

The model generator 110 develops one or more surrogate models 114 based on the simulation data 113, as further described with reference to FIG. 3. In an example, the surrogate model 114 includes at least one of a Kriging model, a least squares analysis of variance (ANOVA) model, a heuristic model, or a metaheuristic model. In a particular aspect, the model generator 110 performs adjustment of the surrogate model 114 using an optimization technique (e.g., a gradient-based descent, a multi-objective optimization approach, a metaheuristic approach, etc.) until an adjustment criterion is met, as further described with reference to FIG. 3. For example, the model generator 110 determines that the adjustment criterion is met in response to detecting expiration of a time period, detecting that a threshold count of iterations of adjustment of the surrogate model 114 have been performed, detecting a convergence of the surrogate model 114, or a combination thereof. In a particular aspect, the model generator 110 detects convergence of the surrogate model 114 in response to determining that the gradient and/or Hessian matrix falls below a specified tolerance, the rate of change of quantities of the surrogate model 114 falls below a specified threshold tolerance, or both. The model generator 110 performs an adjustment of the surrogate model 114 by selecting particular input parameters based on the surrogate model 114, generating simulation data by providing the parameter values of the particular input parameters to the simulation 102, and using the simulation data to develop (e.g., adjust) the surrogate model 114, as further described with reference to FIG. 3.

The model generator 110, in response to determining that the adjustment criterion is met, provides the surrogate model 114 to the test parameter generator 116. The test parameter generator 116 uses the surrogate model 114 to determine one or more physical test parameters 157 for testing the physical system 152, as further described with reference to FIG. 3. In a particular aspect, the test parameter generator 116 provides the physical test parameters 157 to the test platform 156. The test platform 156 performs testing 159 of the physical system 152 based on the physical test parameters 157. For example, the test parameter generator 116, in response to determining that the surrogate model 114 indicates that a first set of input parameters corresponds to (e.g., is predicted to result in) a first set of predicted sensor data and that the first set of input parameters, the first set of predicted sensor data, or a combination thereof, correspond to a condition to be tested, generates the physical test parameters 157 to indicate the first set of input parameters.

In an illustrative example, the test parameter generator 116 determines that the condition to be tested includes failure of a particular component (e.g., a fan blade out) of the physical system 152. The test parameter generator 116 uses the surrogate model 114 to identify a first set of input parameters that corresponds to a first set of predicted sensor data that indicate a failure of the particular component. The test parameter generator 116 generates the physical test parameters 157 to indicate the first set of input parameters and provides the physical test parameters 157 to the test platform 156. The test platform 156 performs the testing 159 based on the physical test parameters 157 (e.g., the first set of input parameters). In a particular aspect, the testing 159 is destructive, expensive, or both. For example, the testing 159 causes destruction (or damage) to the particular component that is expensive, time-consuming, or both, to replace.

In a particular aspect, the sensor 158 generates sensor data 161 during the testing 159 and provide the sensor data 161 to the device 150. In a particular aspect, the workflow manager 154 updates the simulation 102 based on the sensor data 161. For example, the workflow manager 154 dynamically updates the simulation 102 over time based on feedback (e.g., the sensor data 161) from the sensor 158. Dynamically updating the simulation 102 improves reliability of the simulation 102 in modeling the physical system 152 and predicting the resulting sensor data.

The system 100 thus enables the test parameter generator 116 to determine the physical test parameters 157 that correspond to a condition to be tested in fewer tests (e.g., a single test) rather than trying various physical test parameters to create the condition to be tested. Fewer tests conserve resources, such as time and money. The simulation 102 can be validated for test conditions that are rarely observed in actual usage of the physical system 152. In some examples, the simulation 102 can be used to make inferences and update the design of the physical system 152.

Although the workflow manager 154, the simulation 102, the model generator 110, the parameter selector 106, the test parameter generator 116, the device 150, the sensor 158, and the test platform 156 are depicted as separate components, in other implementations the described functionality of two or more of the workflow manager 154, the simulation 102, the model generator 110, the parameter selector 106, the test parameter generator 116, the device 150, the sensor 158, and the test platform 156 can be performed by a single component. In some implementations, each of the workflow manager 154, the simulation 102, the model generator 110, the parameter selector 106, the test parameter generator 116, the device 150, the sensor 158, and the test platform 156 can be represented in hardware, such as via an application-specific integrated circuit (ASIC) or a field-programmable gate array (FPGA), or the operations described with reference to the elements may be performed by a processor executing computer-readable instructions.

Figure 2:
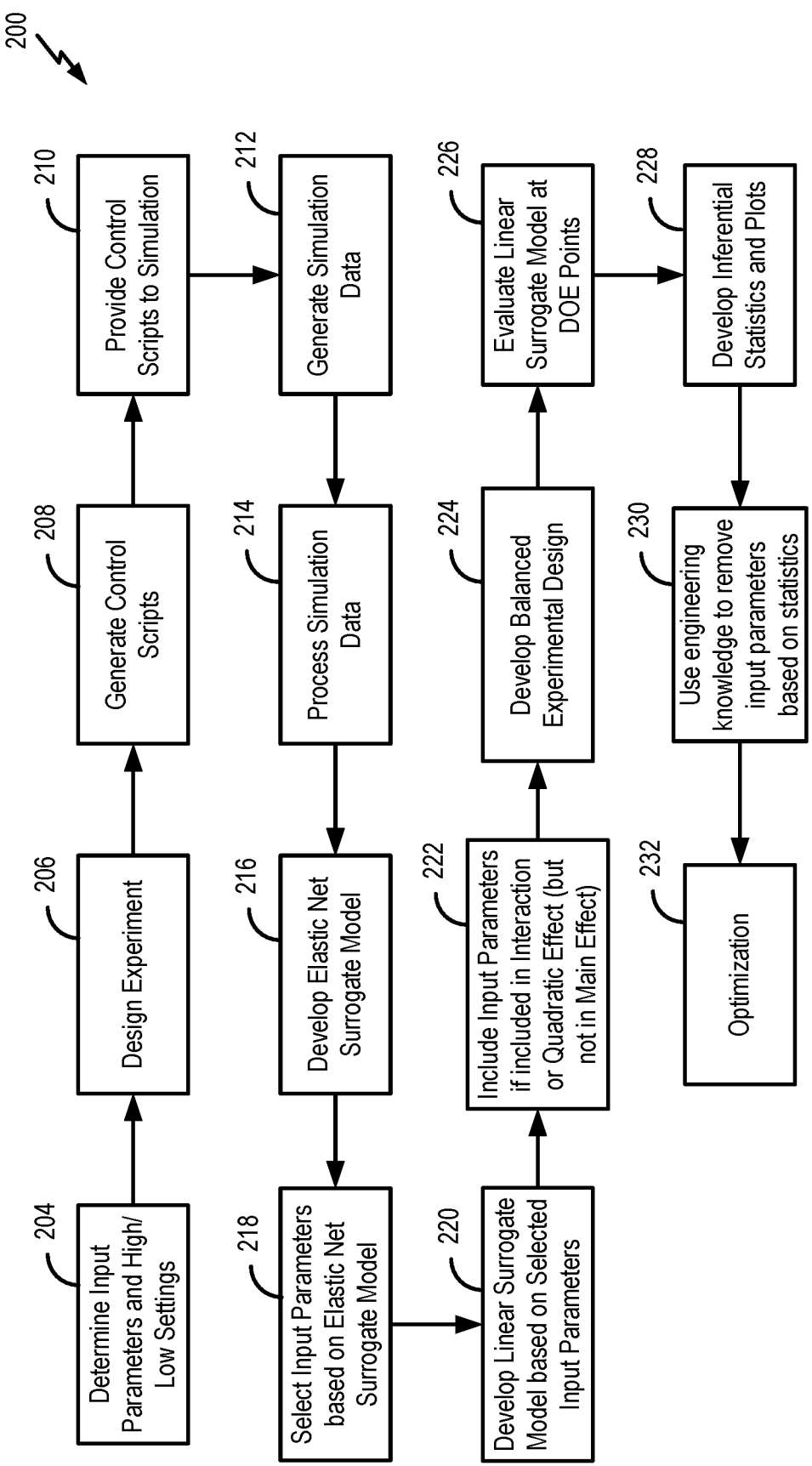
FIG. 2 is a diagram that illustrates an example of a method that can be performed by the system of FIG. 1.

Referring to FIG. 2, a method is shown and generally designated 200. One or more operations of the method 200 can be performed by the simulation 102, the model generator 110, the parameter selector 106, the test parameter generator 116, the workflow manager 154, the device 150, the test platform 156, the physical system 152, the sensor 158, the system 100 of FIG. 1, or a combination thereof.

As described previously in FIG. 1, the workflow manager 154 generates the parameter value sets 101 (e.g., representing an orthogonal array) to query the simulation 102. For example, the workflow manager 154 determines input parameters and settings, at 204, and designs an experiment, at 206. The workflow manager 154 generates control scripts, at 208. For example, the control scripts indicate the parameter value sets 101. The workflow manager 154 provides the control scripts to the simulation 102, at 210. For example, the workflow manager 154 provides control scripts indicating the parameter value sets 101 to the simulation 102, as described with reference to FIG. 1. To illustrate, the workflow manager 154 uses the simulation 102 to process the parameter value set 101a followed by the parameter value set 101b in an ordered sequence. The simulation 102 generates the simulation data 111 by processing the parameter value sets 101, at 212.

The model generator 110 processes the simulation data 111, at 214, to develop a surrogate model 104a (e.g., an elastic net surrogate model), at 216. The parameter selector 106 selects input parameters 105 from the input parameters 131 based on the surrogate model 104a (e.g., the elastic net surrogate model), at 218. For example, the parameter selector 106 uses the elastic net surrogate model to select the input parameters 105 (e.g., significant input parameters) from the input parameters 131. To illustrate, the parameter selector 106 uses the elastic net surrogate model to determine that the input parameters 105 are included in a main effect of a response of the elastic net surrogate model (e.g., an elastic net model).

The model generator 110 generates a surrogate model 104b (e.g., a linear surrogate model) based on the input parameters 105 (e.g., the significant input parameters), at 220. The model generator 110 adds input parameters to the input parameters 105, at 222. For example, the model generator 110 generates the surrogate model 104b (e.g., the linear model) based on the input parameters 105 and a second group of input parameters. The second group of input parameters are not included in a main effect of the response of the elastic net surrogate model, but are included in an interaction or quadratic effect of the response of the elastic net surrogate model.

The parameter selector 106 develops a balanced experimental design, at 224, and evaluates the surrogate model 104b (e.g., the linear surrogate model) at DOE points, at 226, to select the input parameters 141 from the input parameters 131. The parameter selector 106 uses inferential statistics and plots, at 228, to add or remove one or more of the input parameters 131 to the input parameters 141. The parameter selector 106 uses engineering knowledge to add or remove one or more of the input parameters 131 to the input parameters 141, at 230. For example, the parameter selector 106 adds or removes one or more parameters to the input parameters 141 based on user input, configuration data, default data, or a combination thereof. In a particular example, the parameter selector 106 adds a predetermined input parameter to, or removes a predetermined input parameter from, the input parameters 141. The workflow manager 154 manages optimization, at 232, as described with reference to FIG. 3.

Figure 3:
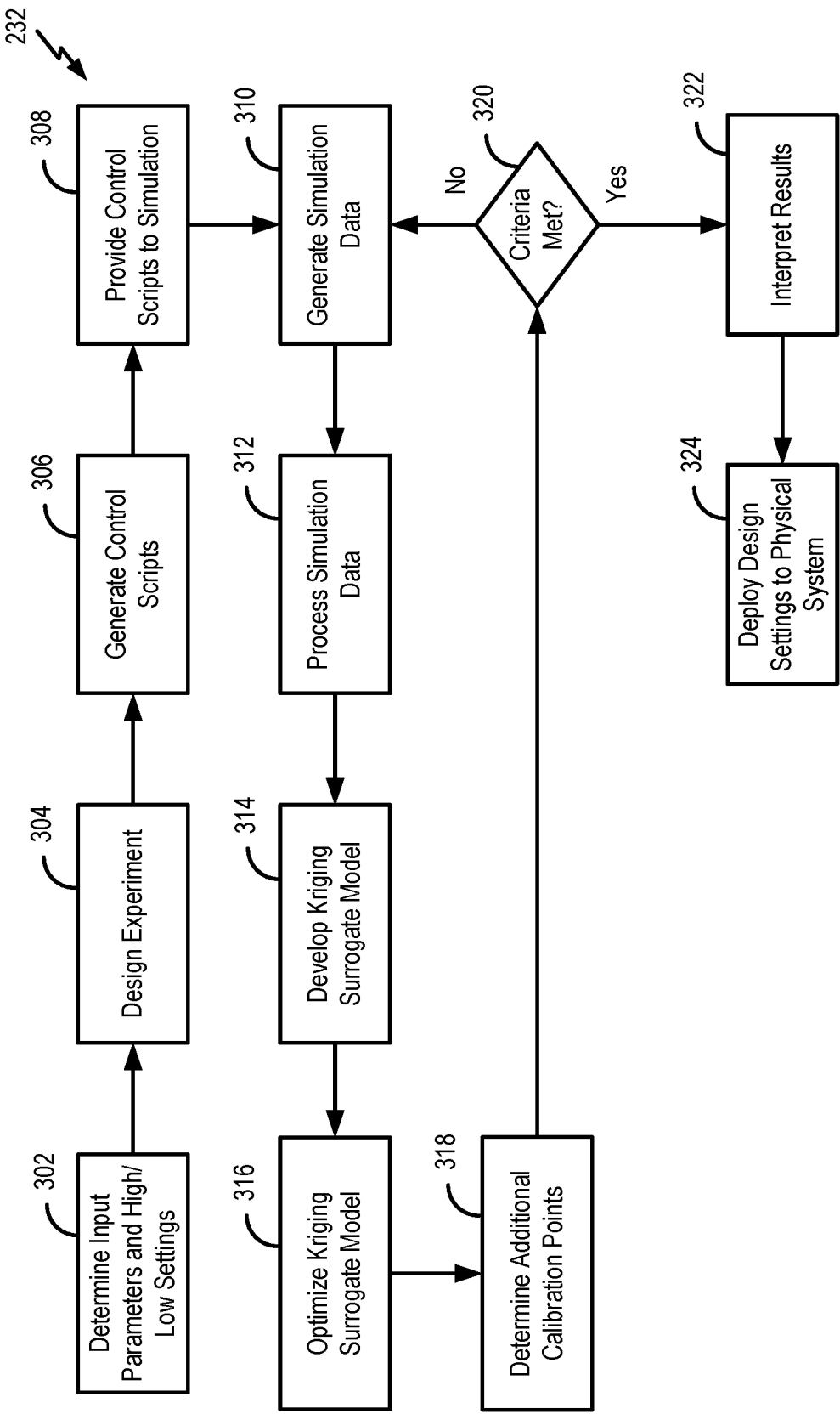
FIG. 3 is a diagram that illustrates an example of a method that can be performed by the system of FIG. 1.

Referring to FIG. 3, an example of the optimization 232 is shown. The workflow manager 154 selects input parameters and settings, at 302, designs an experiment, at 304, generates control scripts at 306, and provides the control scripts to the simulation 102, at 308. For example, the workflow manager 154 selects the parameter value sets 103 corresponding to the input parameters 141. The workflow manager 154 uses experiment design techniques to design an experiment and provides control scripts corresponding to the experiment to the simulation 102 to process the parameter value sets 103. The simulation 102 generates the simulation data 113 by processing the parameter value sets 103, at 310.

The model generator 110 generates the surrogate model 114 (e.g., a Kriging surrogate model) based on the simulation data 113, at 314. The model generator 110 uses various optimization techniques (e.g., a multi-objective optimization technique) to adjust (e.g., optimize) the surrogate model 114 (e.g., the Kriging surrogate model), at 316. The model generator 110 determines additional calibration points, at 318. The model generator 110 determines whether an adjustment criterion is met, at 320. For example, the model generator 110 determines that the adjustment criterion is not met in response to detecting that adjustment time period has not expired, detecting that the surrogate model 114 has not converged, that fewer than a threshold count of adjustment iterations have been performed, or a combination thereof. In a particular aspect, the workflow manager 154 initiates the adjustment time period in response to receiving a request (e.g., a user input) to generate parameters for testing the physical system 152. In a particular aspect, duration of the adjustment time period is based on user input, a configuration setting, or both. The model generator 110, in response to determining that the adjustment criterion is not met, at 320, generates simulation data 113 based on the additional calibration points, at 310, increments a counter indicating adjustment iterations, or both. Alternatively, the model generator 110, in response to determining that the adjustment criterion is met, provides the surrogate model 114 (e.g., the Kriging surrogate model) to the test parameter generator 116.

The test parameter generator 116 interprets the results (e.g., the simulation data 113), at 322. For example, the test parameter generator 116 generates the physical test parameters 157 based on the surrogate model 114 (e.g., the Kriging surrogate model). The test parameter generator 116 deploys design settings to the physical system 152, at 324. For example, the test parameter generator 116 updates settings of the physical system 152. In a particular example, the test parameter generator 116 provides the physical test parameters 157 to the test platform 156. The test platform 156 initiates testing 159 of the physical system 152 based on the physical test parameters 157.

The test parameter generator 116 thus determines the physical test parameters 157 that can be used to update the design of the physical system 152. In some examples, the physical test parameters 157 are based on inferences made from simulation data generated by the simulation 102.

Figure 4:
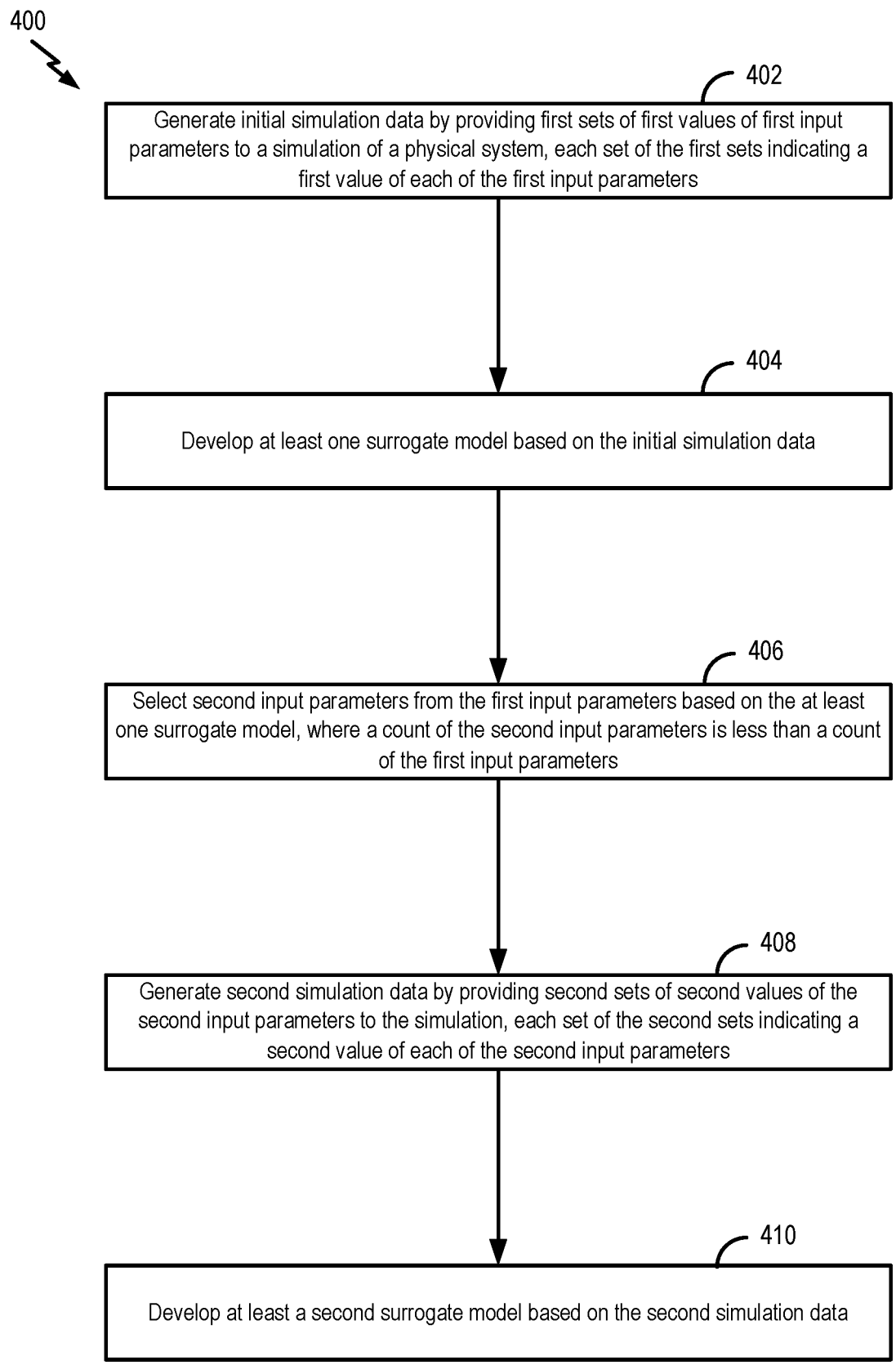
FIG. 4 is a diagram that illustrates a flow chart of an example of method of physical system simulation.

Referring to FIG. 4, a method of physical system simulation is shown and generally designated 400. In a particular aspect, one or more operations of the method 400 can be performed by the simulation 102, the model generator 110, the parameter selector 106, the test parameter generator 116, the workflow manager 154, the device 150, the test platform 156, the physical system 152, the sensor 158, the system 100 of FIG. 1, or a combination thereof.

The method 400 includes generating initial simulation data by providing first sets of first values of first input parameters to a simulation of a physical system, at 402. For example, the workflow manager 154 of FIG. 1 generates the simulation data 111 by providing the parameter value sets 101 of first values (e.g., the parameter values 133, the parameter values 135, or a combination thereof) of the input parameters 131 to the simulation 102 of the physical system 152, as described with reference to FIG. 1. Each set of the parameter value sets 101 indicates a first value of each of the input parameters 131. For example, the parameter value sets 101 include the parameter value set 101a and the parameter value set 101b. The parameter value set 101a indicates a parameter value 133a and a parameter value 133b of an input parameter 131a and an input parameter 131b, respectively. The parameter value set 101b indicates a parameter value 135a and a parameter value 135b of the input parameter 131a and the input parameter 131b, respectively.

The method 400 also includes developing at least one surrogate model based on the initial simulation data, at 404. For example, the model generator 110 of FIG. 1 develops at least one surrogate model 104 based on the simulation data 111, as described with reference to FIG. 1.

The method 400 further includes selecting second input parameters from the first input parameters based on the at least one surrogate model, at 406. For example, the parameter selector 106 of FIG. 1 selects the input parameters 141 from the input parameters 131 based on the at least one surrogate model 104, as described with reference to FIG. 1. There is a larger number of input parameters in the input parameters 131 (e.g. 100 total parameters) than in the input parameters 141 (e.g., 20 parameters), such that a count of the input parameters 141 is less than a count of the input parameters 131.

The method 400 also includes generating second simulation data by providing second sets of second values of the second input parameters to the simulation, at 408. For example, the workflow manager 154 of FIG. 1 generates the simulation data 113 by providing the parameter value sets 103 of second values (e.g., the parameter values 143, the parameter values 145, or a combination thereof) of the input parameters 141 to the simulation 102. Each set of the parameter value sets 103 indicates a second value of each of the input parameters 141. For example, the parameter value sets 103 include the parameter value set 103a and the parameter value set 103b. The parameter value set 103a indicates a parameter value 143a and a parameter value 143b of an input parameter 141a and an input parameter 141*b*, respectively. The parameter value set 103*b* indicates a parameter value 145*a* and a parameter value 145*b* of the input parameter 141*a* and the input parameter 141*b*, respectively.

The method 400 further includes developing at least a second surrogate model based on the second simulation data, at 410. For example, the model generator 110 of FIG. 1 develops at least the surrogate model 114 based on the simulation data 113, as described with reference to FIG. 1.

The method 400 thus enables the model generator 110 to generate the surrogate model 114 based on reliable simulation data that is generated efficiently. For example, the simulation 102 generates the simulation data 113 based on more sets of parameter values for fewer input parameters that have been identified as significant based on the surrogate model 104. The higher number of sets increases reliability and the lower number of input parameters increases computational efficiency.

Figure 5:
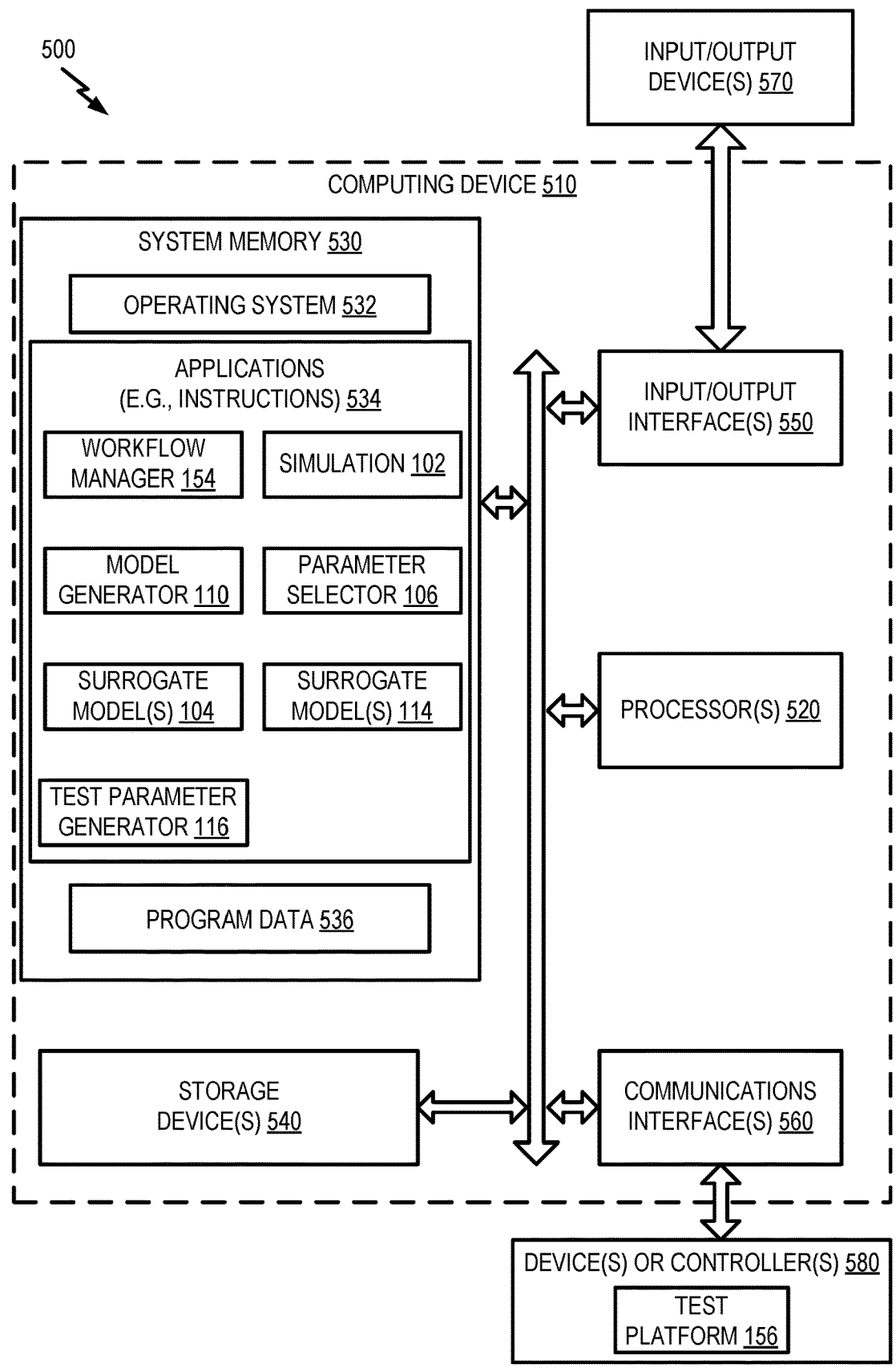
FIG. 5 is a block diagram of a computing environment including a computing device configured to support aspects of computer-implemented methods and computer-executable program instructions (or code) according to the present disclosure.

FIG. 5 is a block diagram of a computing environment 500 including a computing device 510 configured to support aspects of computer-implemented methods and computer-executable program instructions (or code) according to the present disclosure. For example, the computing device 510, or portions thereof, is configured to execute instructions to initiate, perform, or control one or more operations described with reference to FIGS. 1-4.

The computing device 510 includes one or more processors 520. The processor(s) 520 are configured to communicate with system memory 530, one or more storage devices 540, one or more input/output interfaces 550, one or more communications interfaces 560, or any combination thereof. The system memory 530 includes volatile memory devices (e.g., random access memory (RAM) devices), nonvolatile memory devices (e.g., read-only memory (ROM) devices, programmable read-only memory, and flash memory), or both. The system memory 530 stores an operating system 532, which may include a basic input/output system for booting the computing device 510 as well as a full operating system to enable the computing device 510 to interact with users, other programs, and other devices. The system memory 530 stores system (program) data 536, such as the parameter value sets 101, the parameter value sets 103, the simulation data 111, the simulation data 113, the physical test parameters 157, the sensor data 161, the input parameters 131, the input parameters 141, the parameter values 133, the parameter values 135, the parameter values 143, the parameter values 145, or a combination thereof.

The system memory 530 includes one or more applications 534 (e.g., sets of instructions) executable by the processor(s) 520. As an example, the one or more applications 534 include instructions executable by the processor(s) 520 to initiate, control, or perform one or more operations described with reference to FIGS. 1-4. To illustrate, the one or more applications 534 include instructions executable by the processor(s) 520 to initiate, control, or perform one or more operations described with reference to the workflow manager 154, the simulation 102, the model generator 110, the parameter selector 106, the test parameter generator 116, the surrogate model 104, the surrogate model 114, or a combination thereof.

In a particular implementation, the system memory 530 includes a non-transitory, computer readable medium storing the instructions that, when executed by the processor(s) 520, cause the processor(s) 520 to initiate, perform, or control operations to perform a simulation of a physical system. The operations include generating initial simulation data by providing first sets of first values of first input parameters to a simulation of a physical system. Each set of the first sets indicates a first value of each of the first input parameters. The operations also include developing at least one surrogate model based on the initial simulation data. The operations further include selecting second input parameters from the first input parameters based on the at least one surrogate model. A count of the second input parameters is less than a count of the first input parameters. The operations also include generating second simulation data by providing second sets of second values of the second input parameters to the simulation. Each set of the second sets indicates a second value of each of the second input parameters. The operations further include developing at least a second surrogate model based on the second simulation data.

The one or more storage devices 540 include nonvolatile storage devices, such as magnetic disks, optical disks, or flash memory devices. In a particular example, the storage devices 540 include both removable and non-removable memory devices. The storage devices 540 are configured to store an operating system, images of operating systems, applications (e.g., one or more of the applications 534), and program data (e.g., the program data 536). In a particular aspect, the system memory 530, the storage devices 540, or both, include tangible computer-readable media, such as a computer-readable storage device. In a particular aspect, one or more of the storage devices 540 are external to the computing device 510.

The one or more input/output interfaces 550 that enable the computing device 510 to communicate with one or more input/output devices 570 to facilitate user interaction. For example, the one or more input/output interfaces 550 can include a display interface, an input interface, or both. For example, the input/output interface 550 is adapted to receive input from a user, to receive input from another computing device, or a combination thereof. In some implementations, the input/output interface 550 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 570 includes one or more user interface devices and displays, including some combination of buttons, keyboards, pointing devices, displays, speakers, microphones, touch screens, and other devices.

The processor(s) 520 are configured to communicate with devices or controllers 580 via the one or more communications interfaces 560. For example, the one or more communications interfaces 560 can include a network interface. The devices or controllers 580 can include, for example, the test platform 156, one or more other devices, or any combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-5. In some implementations, part or all of one or more of the operations or methods of FIGS. 1-5 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device for physical system simulation, the device comprising:
   a memory configured to store a simulation of a physical system; and
   one or more processors configured to:
      generate initial simulation data by providing first sets of first values of first input parameters to the simulation, each set of the first sets indicating a first value of each of the first input parameters;
      develop at least one surrogate model based on the initial simulation data;
      select second input parameters from the first input parameters based on the at least one surrogate model, wherein a count of the second input parameters is less than a count of the first input parameters;
      generate second simulation data by providing second sets of second values of the second input parameters to the simulation, each set of the second sets indicating a second value of each of the second input parameters, wherein second particular input parameters are predetermined, and wherein the second simulation data is further based on second particular values of the second particular input parameters;
      develop at least a second surrogate model based on the second simulation data;
      receive sensor data during testing of the physical system from one or more sensors configured to monitor the physical system, wherein at least one of the one or more sensors is proximate to the physical system; and
      update the simulation based on the sensor data.

2. The device of claim 1, wherein the second surrogate model includes at least one of a Kriging model, a least squares analysis of variance (ANOVA) model, a heuristic model, or a metaheuristic model.

3. The device of claim 1, wherein the one or more processors are further configured to perform adjustment of the second surrogate model until an adjustment criterion is met.

4. The device of claim 3, wherein the one or more processors are configured to determine that the adjustment criterion is met in response to detecting expiration of a time period, detecting a convergence of the second surrogate model, or both.

5. The device of claim 1, wherein the one or more processors are configured to perform a particular adjustment of the second surrogate model by:
   selecting particular input parameters based on the second surrogate model; and
   generating particular simulation data by providing particular sets of particular values of the particular input parameters to the simulation, each set of the particular sets indicating a particular value of each of the particular input parameters.

6. A method of physical system simulation, the method comprising:
   generating initial simulation data by providing first sets of first values of first input parameters to a simulation of a physical system, each set of the first sets indicating a first value of each of the first input parameters;
   developing at least one surrogate model based on the initial simulation data;
   selecting second input parameters from the first input parameters based on the at least one surrogate model, wherein a count of the second input parameters is less than a count of the first input parameters;
   generating second simulation data by providing second sets of second values of the second input parameters to the simulation, each set of the second sets indicating a second value of each of the second input parameters, wherein second particular input parameters are predetermined, and wherein the second simulation data is further based on second particular values of the second particular input parameters;
   developing at least a second surrogate model based on the second simulation data;
   receiving sensor data during testing of the physical system from one or more sensors configured to monitor the physical system, wherein at least one of the one or more sensors is proximate to the physical system; and
   updating the simulation based on the sensor data.

7. The method of claim 6, wherein the physical system includes a large-scale complex engineering system (LSCES).

8. The method of claim 6, further comprising using the second surrogate model to determine one or more test parameters of a test of the physical system.

9. The method of claim 8, wherein the test is expensive, destructive to the physical system, or both.

10. The method of claim 6, wherein at least one of the sensors is coupled to the physical system.

11. The method of claim 6, wherein a first count of the first sets is less than a second count of the second sets.

12. The method of claim 6, further comprising generating the first sets by using orthogonal array sampling, Latin hypercube sampling, or random sampling.

13. The method of claim 6, wherein the simulation of the physical system is based on finite element modeling, finite volume modeling, eigenmode decomposition analysis, eigenvalue analysis, eigenstate analysis, iterative first-principle modeling, or a combination thereof.

14. The method of claim 6, further comprising:
developing an elastic net surrogate model based on the initial simulation data, the at least one surrogate model including the elastic net surrogate model; and
selecting a group of input parameters from the first input parameters based on the elastic net surrogate model.

15. The method of claim 14, further comprising:
developing one or more linear models based on the group of input parameters, the at least one surrogate model including the one or more linear models; and
selecting at least one of the second input parameters from the group of input parameters based on the one or more linear models.

16. The method of claim 15, wherein the second input parameters are further based on user input, a configuration setting, default data, or a combination thereof.

17. A non-transitory computer-readable medium storing instructions that, when executed by one or more processors, cause the one or more processors to:
generate initial simulation data by providing first sets of first values of first input parameters to a simulation of a physical system, each set of the first sets indicating a first value of each of the first input parameters;
develop at least one surrogate model based on the initial simulation data;
select second input parameters from the first input parameters based on the at least one surrogate model, wherein a count of the second input parameters is less than a count of the first input parameters;
generate second simulation data by providing second sets of second values of the second input parameters to the simulation, each set of the second sets indicating a second value of each of the second input parameters, wherein second particular input parameters are predetermined, and wherein the second simulation data is further based on second particular values of the second particular input parameters;
develop at least a second surrogate model based on the second simulation data;
receive sensor data during testing of the physical system from one or more sensors configured to monitor the physical system, wherein at least one of the one or more sensors is proximate to the physical system; and
update the simulation based on the sensor data.

18. The non-transitory computer-readable medium of claim 17, wherein the instructions, when executed by the one or more processors, further cause the one or more processors to use the second surrogate model to determine one or more test parameters of a test of the physical system.

19. The non-transitory computer-readable medium of claim 17, wherein the one or more processors are configured to:
develop an elastic net surrogate model based on the initial simulation data, the at least one surrogate model including the elastic net surrogate model; and
select a group of input parameters from the first input parameters based on the elastic net surrogate model.

20. The non-transitory computer-readable medium of claim 19, wherein the one or more processors are configured to:
develop one or more linear models based on the group of input parameters, the at least one surrogate model including the one or more linear models; and
select at least one of the second input parameters from the group of input parameters based on the one or more linear models.

21. The non-transitory computer-readable medium of claim 20, wherein the second input parameters are further based on user input, a configuration setting, default data, or a combination thereof.

* * * * *